United States Patent
Chen et al.

(10) Patent No.: US 9,003,241 B2
(45) Date of Patent: Apr. 7, 2015

(54) REPORTING ERRORS ON SERIAL INTERFACES TO APPLICATION LAYERS FOR FLEXIBLE ERROR HANDLING APPROACH SELECTION

(71) Applicant: Telefonaktiebolaget L M Ericsson (PUBL), Stockholm (SE)

(72) Inventors: Sunden Chen, San Jose, CA (US); Patrick Wang, Palo Alto, CA (US); Michael Feng, Mountain View, CA (US); Peter Klikovits, San Jose, CA (US); Edward Ho, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 239 days.

(21) Appl. No.: 13/757,566

(22) Filed: Feb. 1, 2013

(65) Prior Publication Data

US 2014/0223252 A1    Aug. 7, 2014

(51) Int. Cl.

| | |
|---|---|
| *G06F 11/07* | (2006.01) |
| *H04L 1/08* | (2006.01) |
| *G06F 13/42* | (2006.01) |
| *G06F 11/00* | (2006.01) |
| *H04L 1/00* | (2006.01) |

(52) U.S. Cl.
CPC ............. *H04L 1/08* (2013.01); *G06F 13/4282* (2013.01); *G06F 11/00* (2013.01); *H04L 1/00* (2013.01)

(58) Field of Classification Search
CPC .............................. G06F 11/00; G06F 13/4282
USPC ......................................................... 714/48
See application file for complete search history.

(56) References Cited

U.S. PATENT DOCUMENTS

| | | | |
|---|---|---|---|
| 7,146,555 B2 | 12/2006 | Sasaki et al. | |
| 2009/0296587 A1* | 12/2009 | Hsiao | 370/242 |
| 2010/0023843 A1* | 1/2010 | Liu et al. | 714/776 |
| 2010/0287435 A1* | 11/2010 | Tedrow et al. | 714/748 |
| 2012/0026900 A1* | 2/2012 | Chandrasekaran et al. | 370/252 |
| 2012/0036230 A1* | 2/2012 | Tapuska et al. | 709/219 |
| 2013/0262892 A1* | 10/2013 | Radulescu | 713/320 |

OTHER PUBLICATIONS

"Interlaken Protocol Definition, a Joint Specification of Cortina Systems and Cisco Systems," Oct. 7, 2008, 52 pages, Revision 1.2, Cortina Systems Inc. and Cisco Systems Inc.
Laudin, James et al., "The SGI Origin, a ccNUMA Highly Scalable Server". Silicon Graphics, Inc. ISCA '97, The 24th Annual, International Symposium on Computer Architecture. 11 pages, 1997.
Interlaken Alliance, "Interlaken Look-Aside Protocol Definition", Revision 1.0. May 16, 2008. 14 pages.

* cited by examiner

*Primary Examiner* — Chae Ko
(74) *Attorney, Agent, or Firm* — Blakely Sokoloff Taylor & Zafman, LLP

(57) ABSTRACT

A method is performed in a requester device that is coupled with a responder device by a serial interface. The method is one of selecting an approach to handle an error in a request-response communication between the requester and responder devices over the serial interface. The method includes transmitting a request packet, of the request-response communication, over the serial interface, based on a request from an application that is executing on a logical processor. The method includes reporting the error in the request-response communication to an application-layer module. The method includes selecting an error handling approach, of a plurality of error handling approaches, which is to be used to handle the error, with the application-layer module.

25 Claims, 6 Drawing Sheets

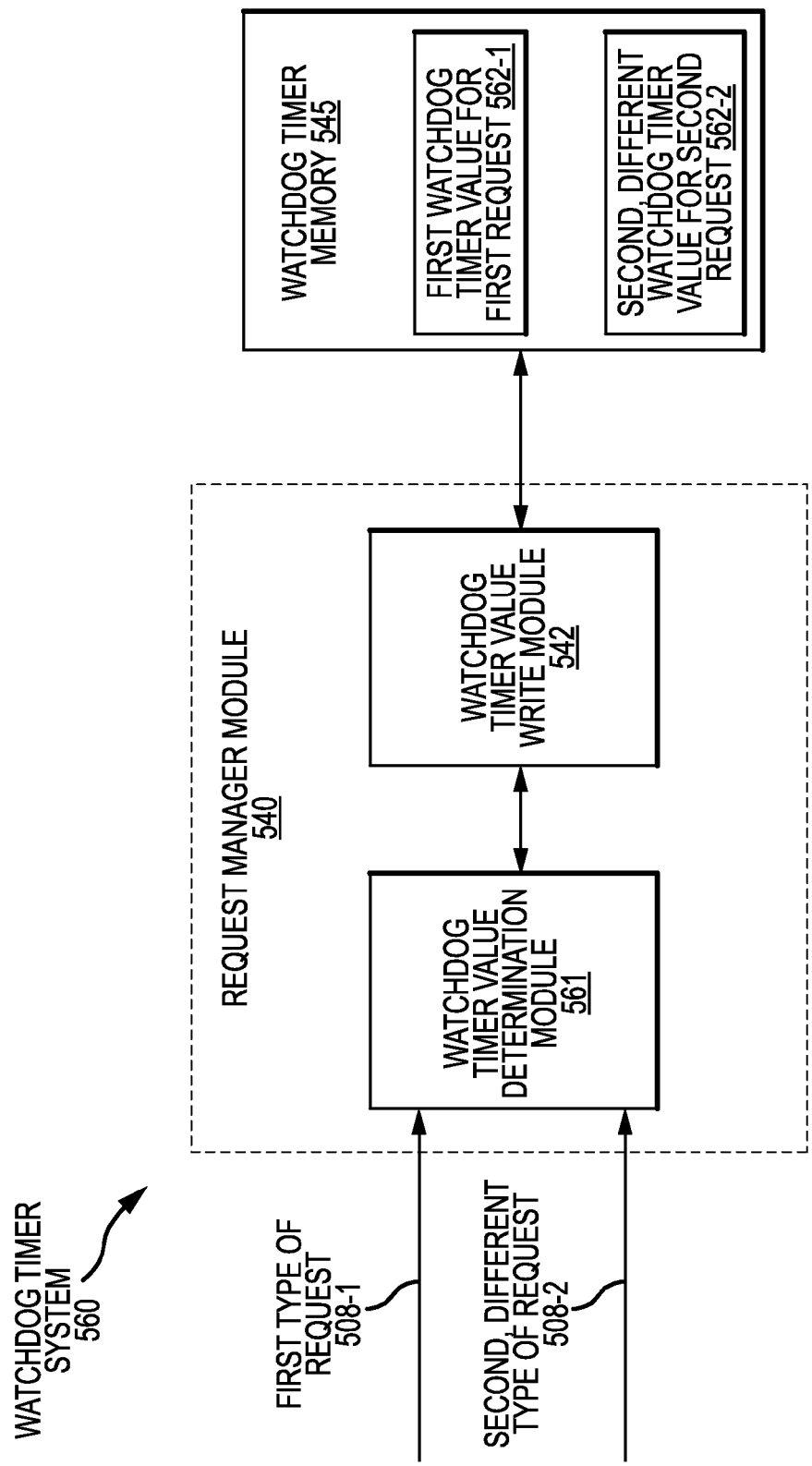

REPORTING ERRORS ON SERIAL INTERFACES TO APPLICATION LAYERS FOR FLEXIBLE ERROR HANDLING APPROACH SELECTION

BACKGROUND

1. Field

Embodiments of the invention relate to the field of serial interfaces; and more specifically, to the handling of errors on serial interfaces.

2. Background Information

Routers and other network devices often include network processors that are coupled with hardware search engines by serial interfaces. By way of example, a network processor may transmit a request packet having a search key to the hardware search engine over the serial interface. The hardware search engine may search a database with the search key. The hardware search engine may then transmit a response packet, for example based on a result of the search, to the network processor over the serial interface. Various protocols may be used for the communication over the serial interface, such as an Interlaken Protocol, various analogous proprietary protocols, or the like.

One challenge is that errors often occur during such request-response communications between the network processors and the search engines over the serial interfaces. The errors may due to various possible factors, such as, for example, errors during transmission on the serial interfaces, internal errors in the network processors when generating the request packets, internal errors in the search engines when generating the response packets, or the like. The errors may be quantified or represented by a bit error rate (BER) which represents the rate of errors or the number of errors that occur per unit of time. By way of example, the BER may be calculated as the total number of bit errors divided by the total number of bits transferred during a period of time. Such errors in communications over the serial interfaces generally tend to become even more significant as the speed or bandwidth of the serial interfaces increases.

One possible approach to handle such errors is for the protocol used for the communication over the serial interface, such as, for example, the Interlaken Protocol, the various analogous proprietary protocols, or the like, to report the error through an interrupt. However, one drawback with reporting the error as an interrupt through the protocol layer is that it generally imposes a relatively high overhead to service. By way of example, the relatively high overhead may be due in part to a lack of knowledge by the protocol of what entity to deliver the interrupt to such that the error interrupt may be broadcast to multiple entities, in part to a need to store and handle state associated with the error, and other overhead associated with the protocol reporting the error through an interrupt. Moreover, the Interlaken Protocol generally always induces re-transmission of response packets when errors are detected.

SUMMARY

In one aspect, a method is performed in a requester device that is coupled with a responder device by a serial interface. The method is one of selecting an approach to handle an error in a request-response communication between the requester and responder devices over the serial interface. The method includes a step of transmitting a request packet, of the request-response communication, over the serial interface, based on a request from an application that is executing on a logical processor. The method also includes a step of reporting the error in the request-response communication to an application-layer module. The method further includes a step of selecting an error handling approach, of a plurality of error handling approaches with the application-layer module. The selected error handling approach is to be used to handle the error. One possible advantage of the method is the ability to flexibly select an approach that is suitable for handling the error instead of statically using the same approach for all errors.

In another aspect, a requester device is operable to be coupled with a responder device by a serial interface. The requester device is operable to select an approach to handle an error in a request-response communication between the requester and responder devices over the serial interface. The requester device includes a plurality of logical processors including a first logical processor that is operable to execute a first application. The requester device also includes a serial interface module coupled with the first logical processor. The serial interface module is operable to transmit a request packet, of the request-response communication, over the serial interface, based on a request from the first application. The requester device also includes an error reporter module and an application-layer error handling approach selection module. The error reporter module is operable to report the error in the request-response communication to the application-layer error handling approach selection module. The application-layer error handling approach selection module is operable to select an error handling approach, of a plurality of error handling approaches, which is to be used to handle the error. One possible advantage of the requester device is that it is operable to flexibly select the error handling approach to be well suited for the error instead of statically using the same error handling approach for all errors.

In yet another aspect, a network processor of a network device is operable to be coupled with a look-aside device of the network device by a serial interface. The network processor is operable to select an approach to handle an error in a request-response communication between the network processor and the look-aside device over the serial interface. The network processor includes a plurality of threads, the plurality of threads including a first thread that is operable to execute a first packet processing application. The network processor also includes a serial interface module coupled with the first thread. The serial interface module is operable to transmit a request packet, of the request-response communication, over the serial interface, based on a request from the first packet processing application. The network processor further includes an error reporter module that is operable to report the error in the request-response communication through an application programming interface (API). The network processor also includes an application-layer error handling approach selection module, which is operable to receive the report of the error through the API. The application-layer error handling approach selection module is operable to select an error handling approach, of a plurality of error handling approaches, that is to be used to handle the error. One possible advantage of the network processor is that it is operable to flexibly select an error handling approach instead of statically using the same error handling approach.

In a still further aspect, a method is performed in a network processor of a network device. The network processor is coupled with a look-aside device of the network device by a serial interface. The method is one of selecting an approach to handle an error in a request-response communication between the network processor and the look-aside device over the serial interface. The method includes a step of transmitting a request packet, of the request-response communication, over the serial interface. The request packet is transmitted based on a request from a packet processing application that is executing on a hardware thread of the network processor. The method also includes a step of reporting the error in the request-response communication through an application programming interface (API). The method further includes a step of selecting, at an application layer, in response to receipt of the report of the error through the API, an error handling approach. The error handling approach is selected from a plurality of error handling approaches. The error handling approach is to be used to handle the error. One possible advantage of the method is the ability to flexibly select an error handling approach that is suitable for an error instead of statically using the same error handling approach for all errors.

BRIEF DESCRIPTION OF THE DRAWINGS

The invention may best be understood by referring to the following description and accompanying drawings that are used to illustrate embodiments of the invention. In the drawings:

FIG. 5 is a block diagram of an embodiment of a watchdog timer system that is operable to determine different watchdog timer values for different types of requests.

DESCRIPTION OF EMBODIMENTS

The following description describes methods and apparatus for reporting errors that occur on serial interfaces to application layers for flexible error handling approach selection. In the following description, numerous specific details are set forth. For example, specific types of requester and responder devices, protocols, approaches for handling errors, logic implementations, logic partitioning/integration choices, and sequences of operations, are set forth. However, it is understood that embodiments of the invention may be practiced without these specific details. In other instances, well-known circuits, structures and techniques have not been shown in detail in order not to obscure the understanding of this description.

Figure 1:
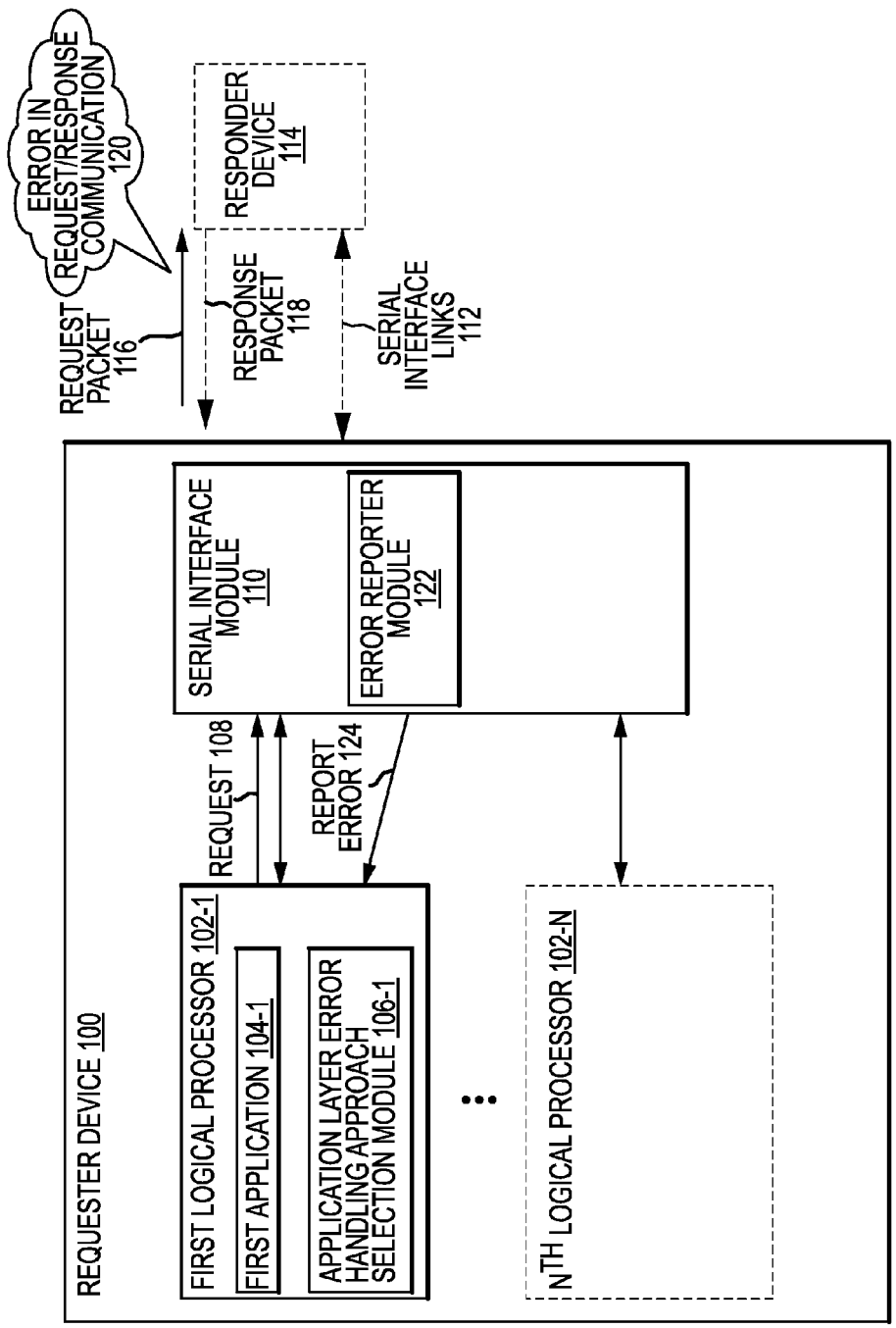
FIG. 1 is a block diagram of an embodiment of a requester device that is operable to be coupled with a responder device by a serial interface.

FIG. 1 is a block diagram of an embodiment of a requester device 100 that is operable to be coupled with a responder device 114 by a serial interface. In the illustration, the responder device and serial interface links 112 are shown in dashed lines to indicate that they are not required components of embodiments pertaining to the requester device or components within the requester device.

In some embodiments, the requester device 100 may represent a processor or other datapath device, and the responder device 114 may represent a look-aside device. The responder device or look-aside device may not reside in-line on the main datapath of the system, but rather may be connected to the side of the main datapath. Often, the look-aside device may examine only a small portion of a packet and/or perform limited operations under control of the associated processor or datapath device that resides in-line on the main datapath. Examples of suitable responder devices and/or look-aside devices include, but are not limited to, look-aside search engines, look-aside policing engines, look-aside access control engines, look-aside queuing and scheduling engines operable to provide a packet transmission order to a packet buffer device, other look-aside engines, look-aside co-processors, and the like.

The requester device includes a plurality of logical processors 102. As shown, in some embodiments, the requester device may have a first logical processor 102-1 through an Nth logical processor 102-N, where N may represent any appropriate number. Often, the number N may range from two to on the order of thousands. Each logical processor may represent a hardware thread, core, thread context, or other type of logical processor. The term core often refers to logic located on an integrated circuit that is capable of maintaining an independent architectural state (e.g., an execution state), in which the independently maintained architectural state is associated with dedicated execution resources. In contrast, the term hardware thread often refers to logic located on an integrated circuit that is capable of maintaining an independent architectural state, in which the independently maintained architectural state shares access to the execution resources it uses. When certain resources are shared by an architectural state, and others are dedicated to the architectural state, the line between a core and a hardware thread is less distinct. Nevertheless, the core and the hardware thread are often viewed by a software scheduler as individual logical processors. The software scheduler is generally able to individually schedule operations on each of the hardware threads, cores, or other logical processors.

Referring again to FIG. 1, each of the logical processors 102 is coupled with a serial interface module 110. In this embodiment, the serial interface module is shared by the logical processors. The first logical processor is operable to execute a first application 104-1. Similarly, each of the other logical processors may be operable to execute an application (not shown). In some embodiments, the first application may represent a packet processing software thread running on the first logical processor. The first application may be operable to provide a request 108 to the serial interface module. The serial interface module may be operable to transmit a corresponding request packet 116, of the request-response communication, over the serial interface links 112 based on and/or in response to the request received from the first application.

The serial interface may have one or more transmit and receive pairs of serial interface links that represent one or more logical serial interfaces. For example, in one implementation there may be a single transmit and receive pair of links that represents one logical interface. As another example, there may be multiple transmit and receive pairs of links that form one logical interface. As yet another example, there may be multiple transmit and receive pairs of links that form multiple logical interfaces. In some embodiments, the serial interface may represent a high speed serial interface, for example having a bandwidth of at least 10 Gbps, at least 50 Gbps, at least 100 Gbps, or even higher, although the scope of the invention is not so limited.

In some embodiments, an error 120 may occur during the request-response communication. The error may occur due to various possible factors, such as, for example, an error that occurs during transmission on the serial interface, an error in the requester device when generating the request and/or the request packet, an error in the responder device when generating a response packet 118, or the like, or a combination of such factors. Accordingly, errors may occur during the generation and/or transmission of either the request and/or response packets. In the illustration, the response packet is shown in dashed lines to indicate that it may or may not be transmitted as a result of the error.

Referring again to FIG. 1, the requester device includes an error reporter module 122. In some embodiments, the error reporter module may be operable to report 124 the error, which has occurred in the request-response transaction between the requester and responder devices, to an application-layer error handling approach selection module 106-1. In some embodiments, the application layer error handling approach selection module may include software that is at least partly or entirely at an application layer or level and/or may be operable to at least partly or entirely perform application layer or level processing. In some embodiments, the error reporter module may convert the detected error into an application programming interface (API) error, or other application-layer signal or application-layer message. In some embodiments, the application layer error handling approach selection module 106-1 may expose the API through which the error is reported as an interface that allows other entities to communicate with it.

In some embodiments, the error reporter module 122 may be operable to report the error selectively and specifically to the application-layer error handling approach selection module 106-1 that corresponds to the logical processor 102-1 that executed the first application 104-1 that made the initial request 108, without needing to report the error to modules of other logical processors (e.g., 102-2 through 102-N). In some embodiments, the report of the error may include error information, such as, for example, a type of the error, information indicating where the error was detected, context information associated with the detected error if available, or the like.

Reporting the error to the application-layer, instead of having protocol-layer software report the error as an interrupt as described in the background section, may offer certain advantages. For one thing, having protocol-layer software report the error as an interrupt generally imposes a relatively higher overhead to service than the overhead that would be incurred when the error is reported to the application layer. For one thing, the protocol layer generally doesn't know which requestor the error or interrupt corresponds to. Additional processing is generally needed in order to determine what application or logical processor the error or interrupt corresponds to. This may be due in part to the possibility that the requestor identifier and/or responder identifier may potentially be corrupted in the packets and may not be reliable. As mentioned, there may be a potentially large number of such applications or logical processors. As a result, conventionally, the protocol layer may broadcast an error interrupt to all of the logical processors, since it generally will not know which particular requestor the error is associated with. The logical processors often need to perform error interrupt handler routines. In addition, there is generally overhead involved in storing and managing state associated with the error so that the state does not get corrupted by the interrupt processing. In short, such conventional handing of errors by the protocol layer generally involve a relatively high overhead.

In some embodiments, the application-layer error handling approach selection module 106-1 may be operable to select an error handling approach, of a plurality of error handling approaches, which is to be used to handle the error in the request-response communication. That is, a flexible rather than a static error handling approach scheme may be utilized.

In some embodiments, the application-layer error handling approach selection module may be operable to select the error handling approach on-the-fly, in real-time, at the time the error is reported.

Various different error handling approaches are contemplated. A first possible error handling approach is to re-attempt the request-response communication in response to the error. For example, in response to the error, the request-response communication may again be requested or otherwise induced. For example, in the case of a corrupted response packet, the corrupted response packet may be dropped, and re-transmission of an uncorrupted replacement response packet may be requested or otherwise induced. Such an error handling approach may be favored for cases when the loss of the associated data cannot be tolerated, would tend to compromise system reliability, would tend to cause improper operation, or the like. However, such an approach often involves a relatively higher cost at the hardware level, due in part to the amount of storage used to implement the packet interface.

A second possible error handling approach is to simply abort the request-response communication without re-attempting the request-response communication. For example, a corrupted response packet may be dropped and no attempt may be made to request or otherwise obtain a replacement response packet. Rather, the erroneous request-response communication may simply be aborted. Such an error handling approach is generally better suited for cases when the loss of data can be tolerated, would generally not compromise system reliability, would generally not cause improper operation, and the like.

These are just a few examples of possible error handling approaches. Other error handling approaches known in the arts are also potentially suitable.

To further illustrate certain concepts, a few concrete examples of how error handling approaches may be selected will be described. In one example embodiment, the serial interface may be used to transmit both mission critical data, for example control data, and non-mission critical data, for example non-control data. By way of example, the control data may be used to control and/or configure the requester device and/or the responder device, such as to configure a routing table, flow table, or the like. Such mission critical or control data, if lost, may tend to affect the reliability and/or the proper operation of such devices. Accordingly, in such an embodiment, the application layer error handling approach selection module may be operable to select the first approach to re-attempt the request-response communication in response to the error when the request-response transaction is used for mission critical or control data, or select the second approach to simply abort the request-response communication without re-attempting the request-response communication when the request-response transaction is used for non-mission critical or non-control data. Other examples of mission-critical data besides control data include, but are not limited to, other types of device configuration information, critical user data information, and the like.

In another example embodiment, the serial interface may be used to transmit data for users or subscribers having different levels of service. For example, a first user or subscriber may have a relatively higher or highest level of service, whereas a second user or subscriber may have a relatively lower or lowest level of service. Such different levels of service may be reflected in subscription or user management information. Accordingly, in such an embodiment, the application layer error handling approach selection module may be operable to select the first approach to re-attempt the request-response communication in response to the error when the request-response transaction is used for the relatively higher or highest level of service, or select the second approach to simply abort the request-response communication without re-attempting the request-response communication when the request-response transaction is used for the relatively lower or lowest level of service.

Accordingly, rather than using a static error handling approach, such as always re-attempting the request-response communication in response to errors, or always ignoring the error condition, flexible error handling approach selection may instead be utilized. Advantageously, this may allow the error handling approach to be selected such that it is efficient, well suited for, or otherwise appropriate for the particular type of data and/or way in which the data is used. In some embodiments, the application-layer error handling approach selection module may be operable to select the error handling approach based on application-layer information. For example, the application-layer information may be received from, may be about, may describe, or may be otherwise associated with the application that initially requested the request-response communication. The application-layer may be better suited than the protocol layer to know what the data is, how the data is to be used, and/or otherwise determine how the error should be handled. The protocol layer generally has limited or no visibility into the use of the packets, or at least less knowledge about their use than the application layer, and is less well equipped to decide how errors should be handling. However, at the application layer, depending upon the particular type of data and/or the way in which the data is used, the requester device may flexibly decide how best to handle the error in a way appropriate for the type of data and its uses, for example whether it is acceptable to live without the data or whether another attempt to obtain the data should be made.

Figure 2:
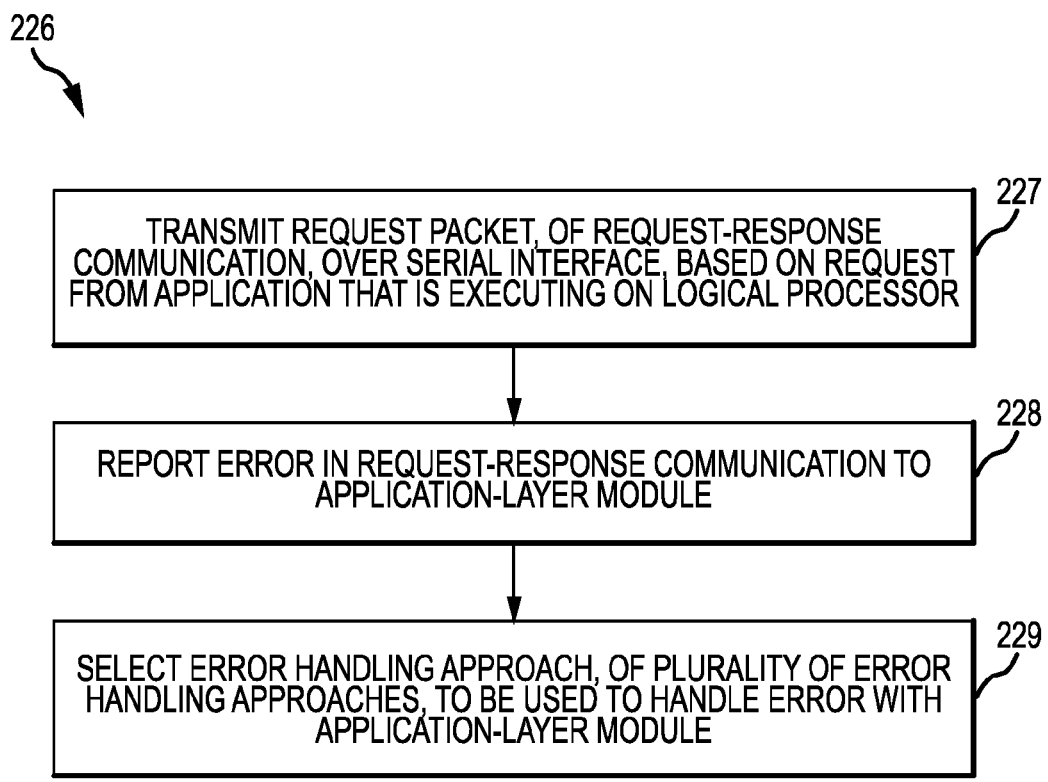
FIG. 2 is a block flow diagram of an embodiment of a method that may be performed by a requester device.

FIG. 2 is a block flow diagram of an embodiment of a method 226 that may be performed in a requester device. The requester device may be coupled with a responder device by a serial interface. The method is one of selecting an approach to handle an error in a request-response communication between the requester and responder devices over the serial interface.

In some embodiments, the method may be performed by the requester device of FIG. 1. Alternatively, the method may be performed by a similar or different requester device than that of FIG. 1. Moreover, the requester device of FIG. 1 may perform the same, similar, or entirely different methods.

The method includes transmitting a request packet, of the request-response communication, over the serial interface, at block 227. The request packet is based on a request from an application that is executing on a logical processor.

The method includes reporting the error in the request-response communication to an application-layer module, at block 228. In some embodiments, the error may be reported through an application programming interface (API). In some embodiments, the error may be reported selectively to the application-layer module corresponding to the application that originated the request but not to other application-layer modules corresponding to other applications that did not originate the request.

The method includes selecting an error handling approach, of a plurality of error handling approaches, which is to be used to handle the error with the application-layer module, at block 229. In some embodiments, the approaches may include at least a first approach to re-attempt the request-response communication in response to the error, and a second approach to abort the request-response communication in response to the error without re-attempting the request-response communication. In some embodiments, the error handling approach may be selected based on application-layer information.

Some embodiments may be incorporated in routers, switches, bridges, or other network devices. As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wireles sly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. Typically, a network device includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network device through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

Within network devices, requester devices may be coupled to responder devices by serial interfaces in different ways in different embodiments. To further illustrate certain concepts, a few possibilities will be described in conjunction with FIGS. 3A-B.

Figure 3A:
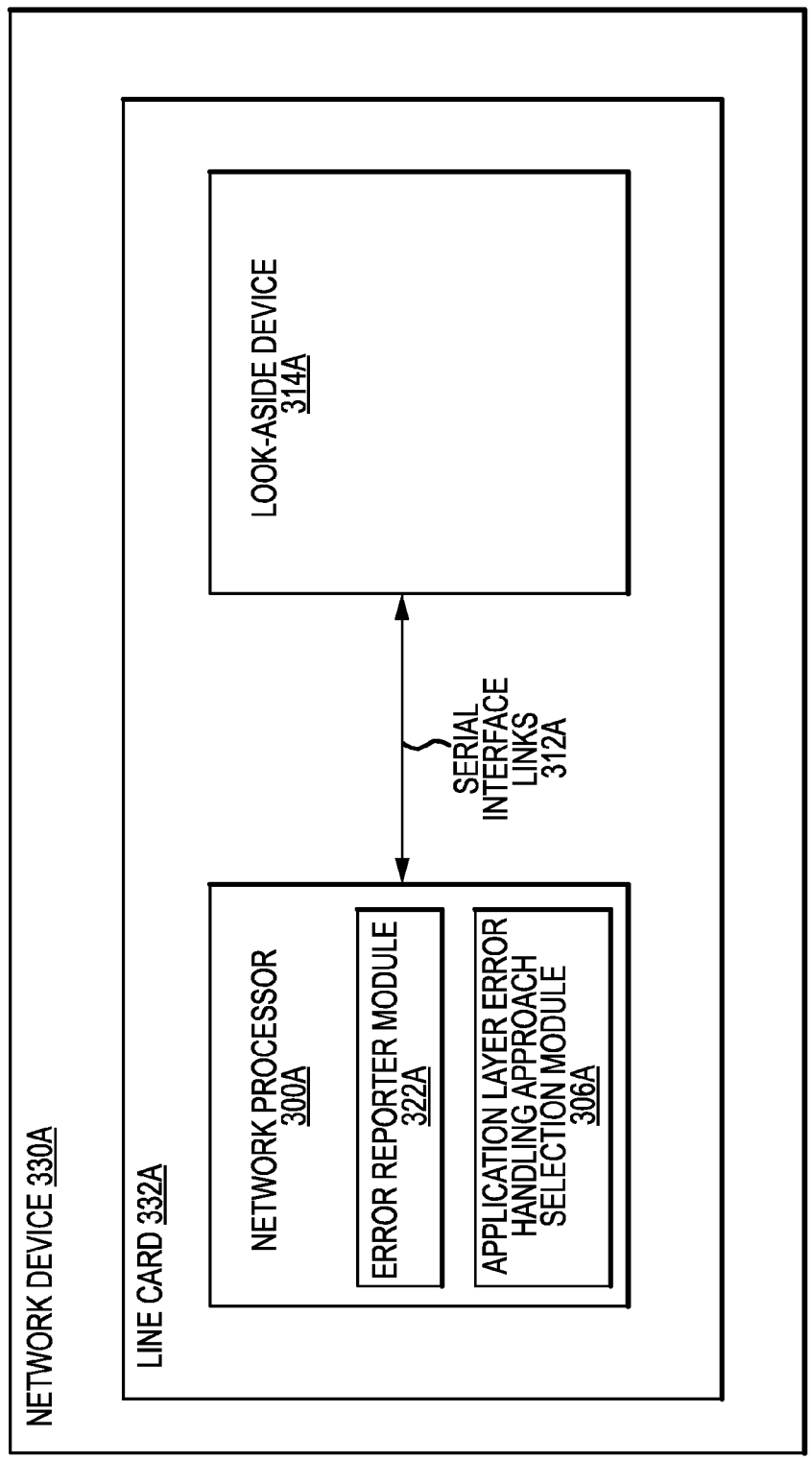
FIG. 3A is a block diagram of a first embodiment of a network device illustrating a first suitable configuration of a network processor and a look-aside device.

FIG. 3A is a block diagram of a first embodiment of a network device 330A illustrating a first suitable configuration of a network processor 300A and a look-aside device 314A. The network device has at least one line card 332A that includes a network processor 300A coupled to a look-aside device 314A by a serial interface. The network processor represents an embodiment of a requester device. The look-aside device represents an embodiment of a responder device. The look-aside device may be any of the previously described look-aside devices, such as, for example, a look-aside hardware search engine, another look-aside engine, a look-aside co-processor, etc. In this embodiment, both the network processor and the look-aside device reside on the same line card. The network processor and the look-aside device are coupled by serial interface links 312A of the serial interface, which may represent lines, traces, or other conductive paths of a circuit board used to implement the line card. The network processor includes an embodiment of an error reporter module 322A and an embodiment of an application layer error handling approach selection module 306A. Each of these modules may be similar to or the same as the corresponding named modules described above for FIG. 1.

Figure 3B:
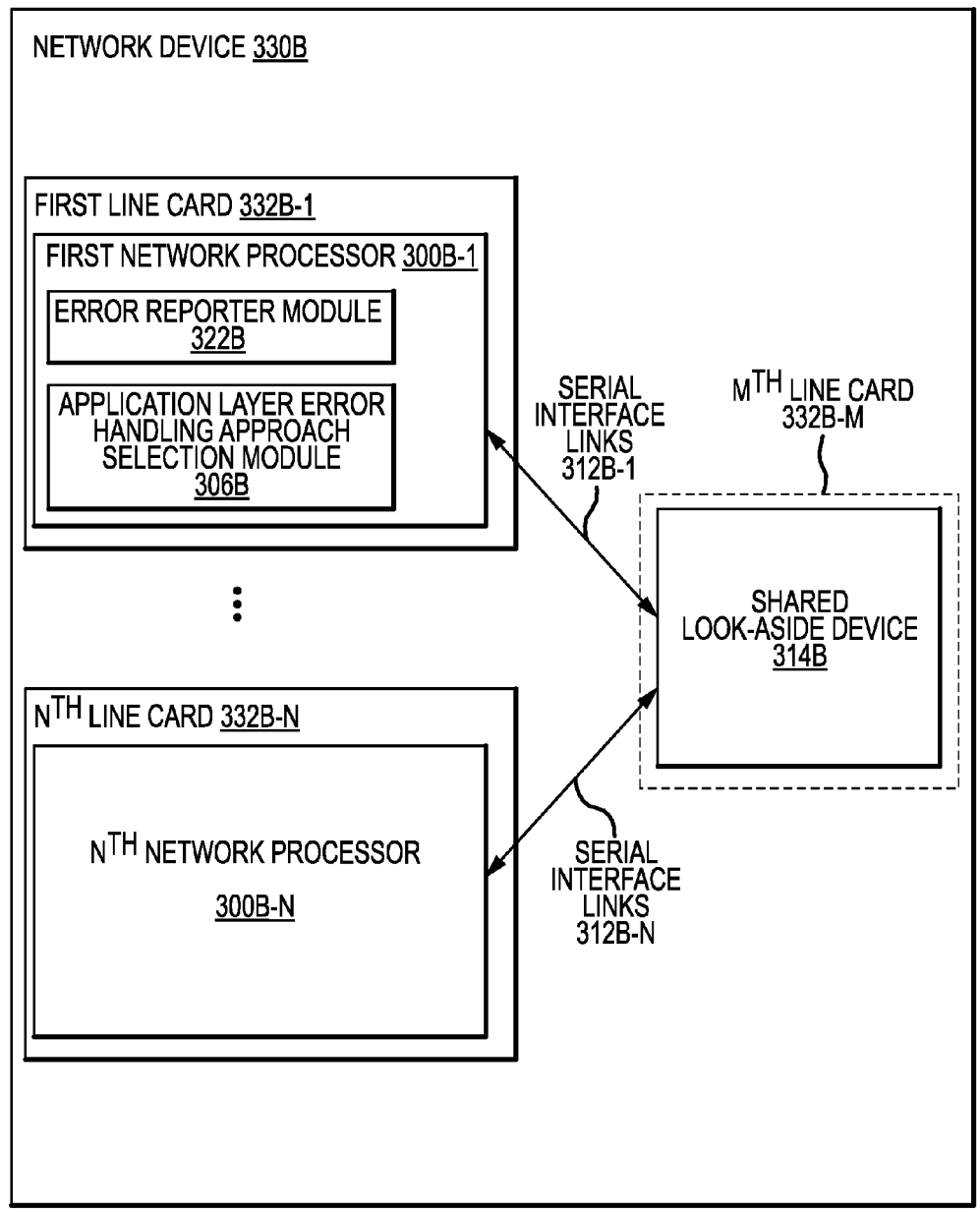
FIG. 3B is a block diagram of a second embodiment of a network device illustrating a second suitable configuration of network processors and a shared look-aside device.

FIG. 3B is a block diagram of a second embodiment of a network device 330B illustrating a second suitable configuration of network processors 300B and a shared look-aside device 314B. The network device has a first line card 332B-1 through an Nth line card 332B-N, where the number of line cards N may be any number appropriate for network devices. The first line card has at least a first network processor 300B-1 and the Nth line card has at least an Nth network processor 300B-N. Similarly, without limitation, each of the other line cards, if any, may have at least one corresponding network processor. The network processors represent embodiments of requester devices. The first network processor is coupled with a shared look-aside device 314B by a first serial interface having a first set of serial interface links 312B-1. The Nth network processor is coupled with the shared look-aside device by an Nth serial interface having an Nth set of serial interface links 312B-N. Similarly, without limitation, each of the other network processors, if any, may be coupled with the shared look-aside device by a different corresponding serial interface and set of serial interface links.

The shared look-aside device represents an embodiment of a responder device. The shared look-aside device may be any of the previously described look-aside devices, such as, for example, a look-aside hardware search engine, another look-aside engine, a look-aside co-processor, etc. In this embodiment, the shared look-aside device resides on different line cards than the first network processor and the Nth network processor. For example, the shared look-aside device may reside on an Mth line card 332B-M. The shared look-aside device is shared by the first and Nth network processors, as well as potentially other network processors on other line cards. The serial interface links may include a mesh or other interconnect used to couple line cards with one another. The first network processor includes an embodiment of an error reporter module 322B and an embodiment of an application layer error handling approach selection module 306B. Similarly, without limitation, one or more or each of the other network processors may include corresponding modules. Each of these modules may be similar to or the same as the corresponding named modules described above for FIG. 1.

It is to be appreciated that these are just a few possible configurations. In other embodiments, the requester and responder devices may be disposed differently in the network devices. For example, multiple network processors on a line card may be coupled with a shared look-aside device on either the same or a different line card. As another example, combinations of the previously described approaches may be used.

Figure 4:
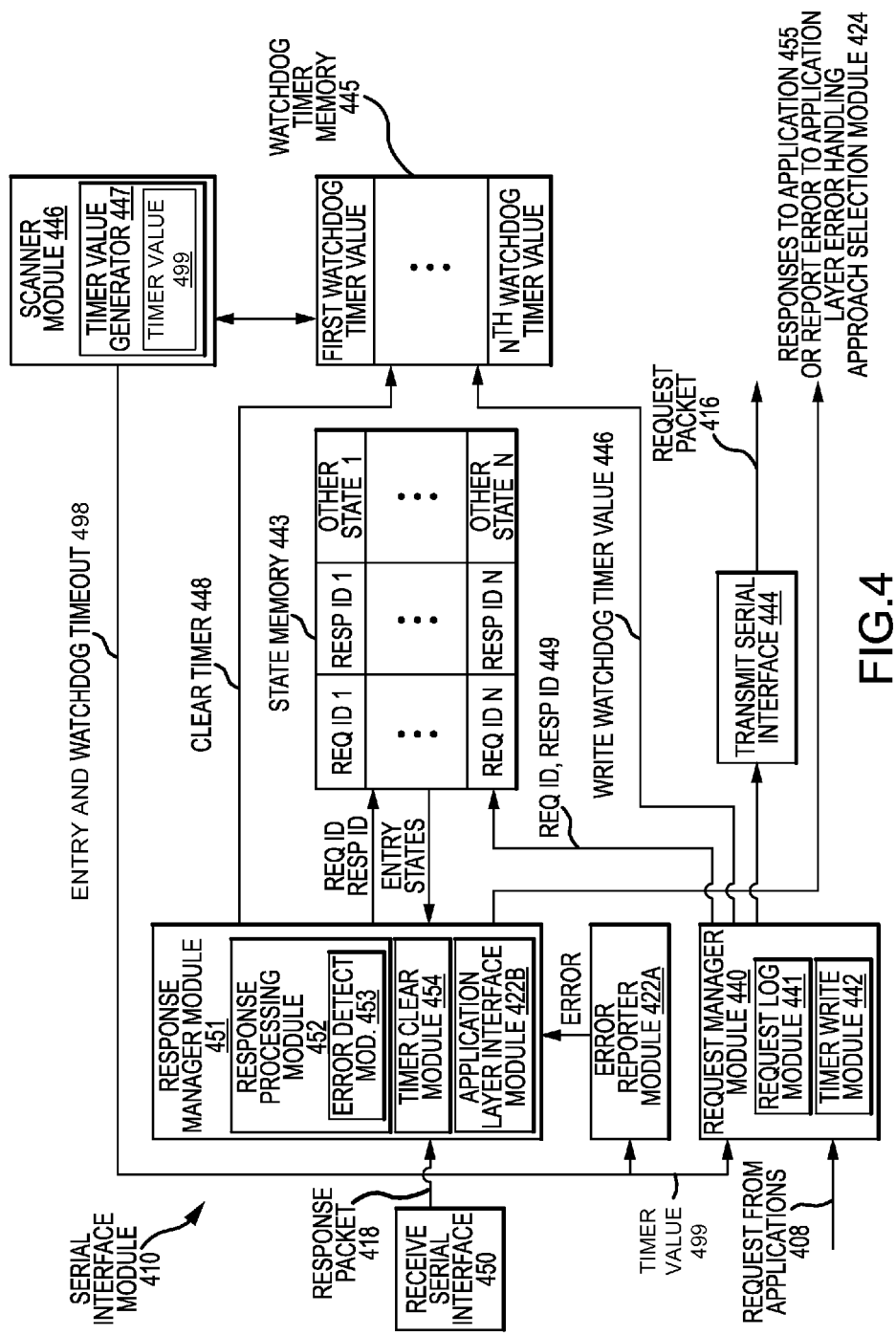
FIG. 4 is a block diagram of a detailed example embodiment of a serial interface module.

FIG. 4 is a block diagram of a detailed example embodiment of a serial interface module 410. In some embodiments, the serial interface module of FIG. 4 may be used in the requester device of FIG. 1, the network processor of FIG. 3A, and/or the first network processor of FIG. 3B. Alternatively, the serial interface module of FIG. 4 may be used in the similar or entirely different requester devices or network processors. Moreover, the requester device of FIG. 1, the network processor of FIG. 3A, and the first network processor of FIG. 3B may use either the same, similar, or entirely different serial interface modules than that of FIG. 4.

The serial interface module 410 may be operable to receive a request 408 from an application. The request may be provided to a request manager module 440 that is operable to process the request. The request manager module may include a request log module 441 that is coupled with a state memory 443, and that is operable to log state associated with the request in a table stored in the state memory. In some embodiments, the system may have multiple requesters (e.g., applications running on logical processors) and/or multiple responders. Identifiers may be used to identify the requesters and/or responders. For example, a requester identifier (REQ ID) may be used to identify a requester from which the request was received. Similarly, a responder identifier (RESP ID) may be used to identify a responder to which the request is directed. By way of example, the request may specify or otherwise indicate the requestor and respondent identifiers. The request log module may log the requester identifier (REQ ID) and the responder identifier (RESP ID) for the request in a new entry of the table in the state memory. The identifiers may help to organize the requests and responses and match responses with requests. In some cases, other state may also optionally be logged in the entry.

In some embodiments, watchdog timers may be used to help detect certain types of errors in request-response communications. Watchdog timer values for different request-response communications may be stored a watchdog timer memory 445. For example, an entry and corresponding watchdog timer value may be included in the watchdog timer memory for each corresponding entry in the state memory. Each entry in the state memory and corresponding entry in the watchdog timer memory may correspond to the same request-response transaction. The request manager module 440 may include a watchdog timer write module 442, that is coupled with the watchdog timer memory, and that is operable to write a watchdog timer value to an entry in the watchdog timer memory that corresponds to the entry in the state memory where the state information was logged for the communication. This is shown in the illustration as write watchdog timer value 446.

The written watchdog timer values may represent times within which the request-response communications are expected to complete or else an error is to be inferred. After a request packet 416 has been transmitted through a transmit serial interface 444 onto the serial interface links, counting may be initiated. The watchdog timer values may be implemented in different ways. As one example, counting may be from zero up to the watchdog timer value. As another example, counting may be from the watchdog timer value down to zero. As yet another example, counting may be from a starting timestamp to a timeout duration. If the request-response communication does not complete within the watchdog timer value, then this may be interpreted as an error.

A scanner module 446 may scan the watchdog timer values in the watchdog timer memory and monitor to see if any of the watchdog timer values has expired. For example, in some embodiments, the watchdog timers may be implemented using timestamps, timeout durations, and a global timer. The scanner module may have a global timer value geneator 447 to keep a global timer value 499. The timer write module 442 may use the global timer value to write the watchdog timer memory when an entry is added in response to a request. The scanner module may retrieve timestamps and timeout durations from the entries of the watchdog timer memory. The scanner module may compare the timestamps and timeout durations with the global timer value in order to determine whether or not the corresponding requests are timed out. If a watchdog timer value expires or times-out, the scanner module 446 may report an entry identifier and watchdog timeout 498 to an error reporter module 422A. The entry identifier may indicate an entry in the watchdog timer memory that corresponds to a corresponding entry in the state memory and that both correspond to a particular request-response transaction. Advantageously, the entry identifier may therefore identify a particular requester identifier and/or requester device to which the error is to be reported, which may help to avoid needing to broadcast the error to multiple requester devices most of which (e.g., all but one of which) do not actually need to be alerted of the error. The entry identifier and watchdog timeout 498 may also be reported to the request manager module 440, for example to allow it to clean up requesting thread states.

The watchdog timer values may be used to detect various types of errors. For example, they may be able to detect errors in generating request packets, errors in transmitting the request packets, errors in receiving response packets, the responder device being down, and the like. The responder device may receive such corrupted request packets and detect that they are corrupted, for example by using CRC or other error detection data. In some embodiments, the responder device may not perform an action, for example not perform a search, and may not return a result packet, since the action if taken and/or the result if returned may potentially be erroneous due to the corrupted request packet. As a result, the watchdog timer value may expire, which may cause an error. In some embodiments, the responder device, upon detecting an error in a request packet, upon experiencing an internal error, or the like, may proactively signal the requester device about the error, although this is not required.

Most of the time, a corresponding response packet 418 of the request-response transaction will be received from the serial interface links on a receive serial interface 450. The response packet may be provided to a response manager module 451. The response manager module may include a response processing module 452 that is operable to process the response packet. The response processing module may include an error detection module 453 that is operable to detect errors in the response packet if and when such errors exist. For example, the response packet may have error detection data that may be used to detect errors and/or validate the integrity of the response packet. Examples of such error detection data include cyclic redundancy check (CRC) data, other redundancy data, and other types of error detection data known in the arts. If an error is detected in the response packet it may be reported to the error reporter module 422A. In such cases, the corrupted response packet will generally be dropped or disregarded.

Alternatively, if a response packet is received and has no error, then a timer clear module 454 of the response manager module may clear a corresponding watchdog timer value in the watchdog timer memory for the request-response transaction. This is shown in the illustration as clear timer 448. This may indicate that the request-response transaction has completed without error. The response manager module may access the state information logged in the corresponding entry of the state memory for the request-response transaction. In some embodiments, a requester identifier (REQ ID) and responder identifier (RESP ID) of the response packet may be used to identify the appropriate entry. A response 455 based on the response packet and the state information may be returned to the application that sent the initial request 408. In some embodiments, the response may be delivered selectively and specifically to this requesting application, by using the requester identifier (REQ ID) from the corresponding entry in the state memory to identify the requesting application, without delivering the response to other non-requesting applications. In some embodiments, the response may be provided to the requesting application through an API.

As mentioned above, detected errors may be reported to the error reporter module 422A. In the illustrated embodiment, the error reporter module is shown as a separate module. Alternatively, the error reporter module may be part of another module (e.g., part of the request manager module). In some embodiments, the error reporter module may include, or be coupled with, an application layer interface module 422B that is operable to interface with an application layer and report the error to the application layer. In the illustrated embodiment, the application layer interface module 422B is shown as being part of the response manager module 451, although this is not required. The application layer interface module may be used both to provide responses to applications when response packets are received successfully and provide reports of errors to application layer error handling approach selection modules. This is shown in the illustration as response to application 455 or report error 424 to application layer error handling approach selection module. The errors may be reported to the application layer as previously described, such as, for example, through an API. In some embodiments, the requester identifier (REQ ID) from the state memory 443 may be used to identify the requester that the error is to be reported to. That is, in some embodiments, the error may be reported or directed specifically and selectively to the requester corresponding to the initial request but not to other requesters. In contrast, in the case of an interrupt from a protocol level module, the interrupt is typically not reported or directed specifically or selectively to any particular requester.

This is just one illustrative example of a suitable serial interface module. Other embodiments may use different error detection approaches. For example, rather than using a watchdog timeout values, error reporting or signaling between the requester and responder devices may be used. Other error detection approaches known in the arts may also potentially be used. Other embodiments may include additional components, omit some of the illustrated components, or omit some of the illustrated components and include additional components. In other embodiments, the components may be partitioned and/or integrated differently. Still other modifications will be apparent to those skilled in the art and having the benefit of the present disclosure.

FIG. 5 is a block diagram of an embodiment of a watchdog timer system 560 that is operable to determine different watchdog timer values for different types of requests. In some embodiments, the watchdog timer system of FIG. 5 may be included in the requester device of FIG. 1, the network processor of FIG. 3A, the network processors of FIG. 3B, and/or the serial interface module of FIG. 4. Alternatively, the watchdog timer system may be included in similar or entirely different requester devices, network processors, or serial interface modules. Moreover, the requester device of FIG. 1, the network processor of FIG. 3A, the network processors of FIG. 3B, and/or the serial interface module of FIG. 4 may include either the same, similar, or entirely different watchdog timer systems than that of FIG. 5.

The watchdog timer system includes a watchdog timer value determination module 561. The watchdog timer value determination module may receive a first type of request 508-1 and a second, different type of request 508-2. The watchdog timer value determination module is operable to determine a first watchdog timer value 562-1 for the first request 508-1 and a second, different watchdog timer value 562-2 for the second request 508-2. The first and second watchdog timer values are different in that one timer value is greater than the other. A watchdog timer value write module 542 is coupled with the watchdog timer value determination module and is operable to write the determined watchdog timer values in the watchdog timer memory. For example, the first watchdog timer value may be written in an entry that corresponds to the first request, and the second watchdog timer value may be written in an entry that corresponds to the second request. As shown, in some embodiments, the watchdog timer value determination module and the watchdog timer value write module may optionally be included in a request manager module 540, although this is not required.

The different watchdog timer values for the different types of requests may be used in different ways in different embodiments. In some embodiments, a larger watchdog timer value may be determined for a request-response transaction having a longer expected completion time, whereas a smaller watchdog timer value may be determined for a request-response transaction having a shorter expected completion time. For example, a search of a relatively large table, a relatively complicated search (e.g., a chained sequence of searches), or other search expected to take a longer time, may be given a relatively larger watchdog timer value than a search of a relatively small table, a relatively simple search (e.g., a single un-chained search), or other search expected to take a shorter time. As another example, a write to a database may be given a relatively smaller watchdog timer value than a search of the database. Advantageously, this may help to allow errors to be detected earlier for request-response communications having shorter expected completion times, while selectively allowing more time for request-response communications having longer expected completion times.

In other embodiments, a larger watchdog timer value may be determined for a request-response transaction that is less time critical, whereas a smaller watchdog timer value may be determined for a request-response transaction that is more time critical. Advantageously, this may help to allow errors to be detected earlier for more time critical request-response communications, while selectively allowing more time for less time critical request-response communications. Still other uses will be apparent to those skilled in the art and having the benefit of the present disclosure.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below. In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to use such feature, structure, or characteristic in connection with other embodiments even when not explicitly described.

In the description and claims, the terms "coupled" and "connected," along with their derivatives, may be used. It should be understood that these terms are not intended as synonyms for each other. "Coupled" is used to indicate that two or more elements or devices, which may or may not be in direct physical or electrical contact with each other, co-operate or interact with each other. "Connected" is used to indicate the establishment of communication between two or more elements or devices that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated. The components, features, and specific optional details described herein for an apparatus also optionally apply to the methods described herein, which may in embodiments be performed by and/or with such an apparatus.

Different embodiments of the invention may be implemented using different combinations of software, firmware, and/or hardware. Thus, the techniques shown in the figures can be implemented using code and data stored and executed on one or more electronic devices (e.g., an end station, a network device). Such electronic devices store and communicate (internally and/or with other electronic devices over a network) code and data using computer-readable media, such as tangible, non-transitory computer-readable storage media and non-tangible transitory computer-readable communication or transmission media.

A few representative examples of tangible, non-transitory computer-readable storage media include, but are not limited to, magnetic disks, optical disks, random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices, phase-change memory, and the like. The tangible storage media may include one or more solid-state or tangible physical materials, such as, for example, a semiconductor material, a phase change material, a magnetic material, a data storage material, etc. Embodiments pertain to an article of manufacture that includes a tangible non-transitory computer-readable storage media storing a sequence of instructions that if executed by a machine (e.g., a network device, switch, router, end station, host, computer system, or electronic device having at least one microprocessor) causes or results in the machine performing one or more operations or methods disclosed herein. A few representative examples of non-tangible transitory computer-readable transmission media include, but are not limited to, electrical, optical, acoustical or other form of propagated signals—such as carrier waves, infrared signals, and digital signals.

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method, performed in a requester device that is coupled with a responder device by a serial interface, of selecting an approach to handle an error in a request-response communication between the requester and responder devices over the serial interface, the method comprising steps of:
   transmitting a request packet, of the request-response communication, over the serial interface, based on a request from an application that is executing on a logical processor;
   reporting the error in the request-response communication to an application-layer module; and
   selecting an error handling approach, of a plurality of error handling approaches, that is to be used to handle the error with the application-layer module.

2. The method of claim 1, wherein the step of reporting comprises reporting the error to the application-layer module through an application programming interface (API).

3. The method of claim 1, wherein the step of selecting comprises selecting the error handling approach from error handling approaches that include at least:
   a first approach to re-attempt the request-response communication in response to the error; and
   a second approach to abort the request-response communication in response to the error without re-attempting the request-response communication.

4. The method of claim 3, wherein the step of selecting comprises:
   selecting the first approach when the request-response communication is used for control; or
   selecting the second approach when the request-response communication is not used for control.

5. The method of claim 3, wherein the step of selecting comprises:
   selecting the first approach when the request-response communication is mission critical; or
   selecting the second approach when the request-response communication is not mission critical.

6. The method of claim 3, wherein the step of selecting comprises:
   selecting the first approach when the request-response communication corresponds to a higher level of service; or
   selecting the second approach when the request-response communication corresponds to a lower level of service.

7. The method of claim 1, wherein the step of selecting comprises selecting the error handling approach in real time, at a time when the error was reported, based on application-layer information corresponding to the application executing on the logical processor.

8. The method of claim 1, wherein the step of reporting comprises reporting the error selectively to the application-layer module, which corresponds to the logical processor, without reporting the error to application-layer error handling modules corresponding to other logical processors.

9. The method of claim 8, further comprising determining the logical processor from a requester identifier from an entry of a table that corresponds to the request-response communication.

10. The method of claim 1, wherein the step of reporting comprises reporting the error to the application-layer module without the logical processor having to perform an error interrupt handler routine.

11. The method of claim 1, further comprising:
    setting a larger watchdog timer value for a request-response communication having a longer expected completion time; and
    setting a smaller watchdog timer value for a request-response communication having a shorter expected completion time.

12. The method of claim 1, further comprising steps of:
    setting a first watchdog timer value for the request-response communication;
    setting a second, different watchdog timer value for a second request-response communication of a different type; and
    detecting an error in the second request-response communication in response to expiration of the second watchdog timer value without completing the second request-response communication.

13. The method of claim 1, wherein the step of transmitting comprises transmitting the request packet from a network processor of a line card of a network device to the responder device, which is a look-aside device of the network device.

14. A requester device, which is operable to be coupled with a responder device by a serial interface, the requester device operable to select an approach to handle an error in a request-response communication between the requester and responder devices over the serial interface, the requester device comprising:
    a plurality of logical processors, the plurality of logical processors including a first logical processor that is operable to execute a first application;
    a serial interface module coupled with the first logical processor, the serial interface module operable to transmit a request packet of the request-response communication over the serial interface based on a request from the first application;
    an error reporter module that is operable to report the error in the request-response communication to an application-layer error handling approach selection module; and
    the application-layer error handling approach selection module, which is operable to select an error handling approach, of a plurality of error handling approaches, that is to be used to handle the error.

15. The requester device of claim 14, wherein the error reporter module is operable to report the error to the application-layer error handling approach selection module through an application programming interface (API).

16. The requester device of claim 14, wherein the application-layer error handling approach selection module is operable to select the error handling approach from error handling approaches that include at least:

a first approach to re-attempt the request-response communication in response to the error; and a second approach to abort the request-response communication in response to the error without re-attempting the request-response communication.

17. The requester device of claim 14, wherein the application-layer error handling approach selection module is operable to select the error handling approach in real time, when the error was reported, and based on application-layer information.

18. The requester device of claim 14, wherein the error reporter module is operable to report the error selectively to the application-layer error handling approach selection module, which is to correspond to the first logical processor, without reporting the error to other application-layer error handling approach selection modules that are to correspond to other logical processors.

19. The requester device of claim 18, wherein a requester identifier from an entry that corresponds to the request-response communication in a state memory is to be used to report the error selectively to the application-layer error handling approach selection module.

20. The requester device of claim 14, wherein the error reporter module is operable to report the error to the application-layer error handling approach selection module without the logical processor having to perform an error interrupt handler routine.

21. The requester device of claim 14, further comprising a watchdog timer value determination module that is operable to determine a first watchdog timer value for the request-response communication and operable to determine a second, different watchdog timer value for a second request-response communication.

22. The requester device of claim 21, wherein the watchdog timer value determination module is operable to determine the different watchdog timer values for different request-response communications having different expected completion times.

23. The requester device of claim 14, wherein the requester device comprises a network processor of a line card of a network device and the responder device comprises a look-aside device of the network device.

24. A network processor of a network device, the network processor operable to be coupled with a look-aside device of the network device by a serial interface, the network processor operable to select an approach to handle an error in a request-response communication between the network processor and the look-aside device over the serial interface, the network processor comprising:

a plurality of threads, the plurality of threads including a first thread that is operable to execute a first packet processing application;

a serial interface module coupled with the first thread, the serial interface module operable to transmit a request packet of the request-response communication over the serial interface based on a request from the first packet processing application;

an error reporter module that is operable to report the error in the request-response communication through an application programming interface (API); and an application-layer error handling approach selection module, which is operable to receive the report of the error through the API, and which is operable to select an error handling approach, of a plurality of error handling approaches, that is to be used to handle the error.

25. A method, performed in a network processor of a network device, the network processor coupled with a look-aside device of the network device by a serial interface, of selecting an approach to handle an error in a request-response communication between the network processor and the look-aside device over the serial interface, the method comprising steps of:

transmitting a request packet, of the request-response communication, over the serial interface, based on a request from a packet processing application that is executing on a hardware thread of the network processor;

reporting the error in the request-response communication through an application programming interface (API); and selecting, at an application layer, in response to receipt of the report of the error through the API, an error handling approach, of a plurality of error handling approaches, that is to be used to handle the error.

* * * * *

UNITED STATES PATENT AND TRADEMARK OFFICE
CERTIFICATE OF CORRECTION

| | | |
|---|---|---|
| PATENT NO. | : 9,003,241 B2 | Page 1 of 1 |
| APPLICATION NO. | : 13/757566 | |
| DATED | : April 7, 2015 | |
| INVENTOR(S) | : Chen et al. | |

It is certified that error appears in the above-identified patent and that said Letters Patent is hereby corrected as shown below:

In the Specification

In Column 5, Line 60, delete "conventional handing" and insert -- conventional handling --, therefor.

In Column 10, Line 65, delete "value geneator" and insert -- value generator --, therefor.

Signed and Sealed this
Eighteenth Day of August, 2015

Michelle K. Lee
*Director of the United States Patent and Trademark Office*